March 3, 1959
M. A. PROVI ET AL
2,875,999
BATHROOM SCALE
Filed Aug. 31, 1954
3 Sheets-Sheet 1
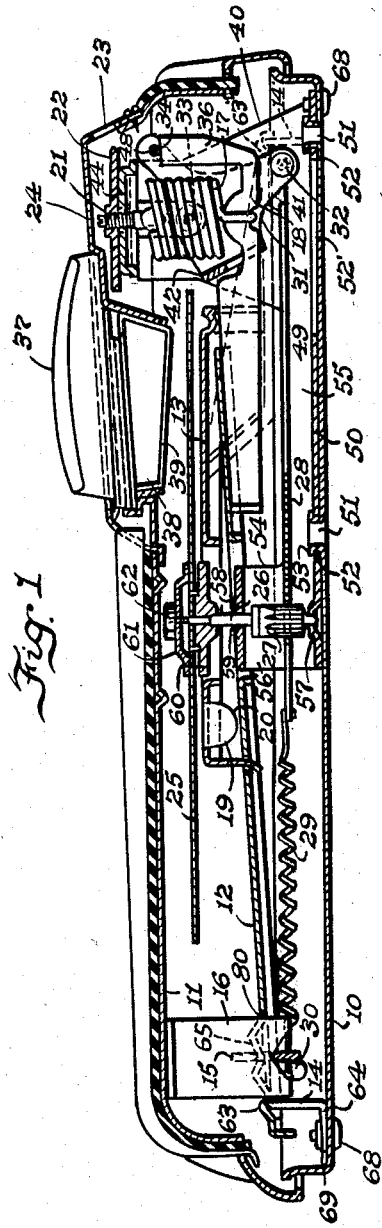
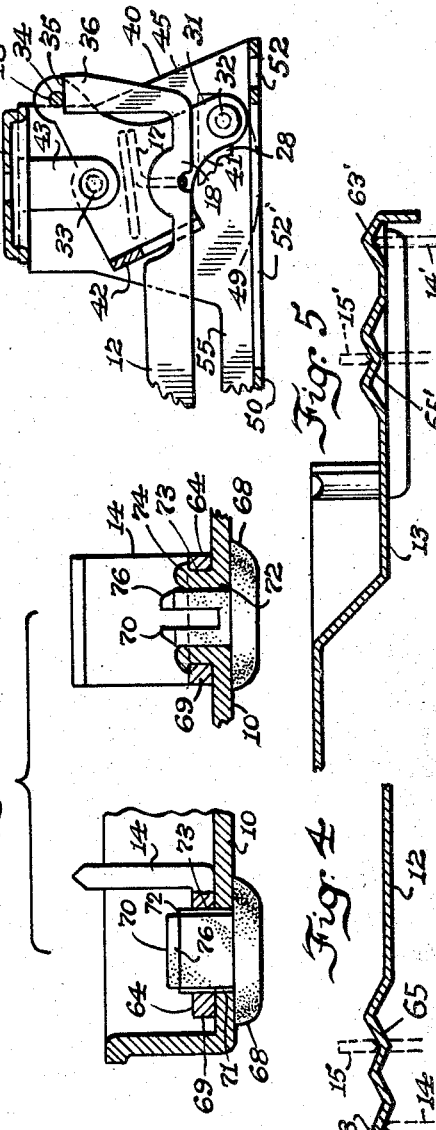
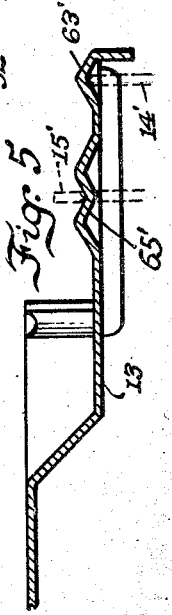
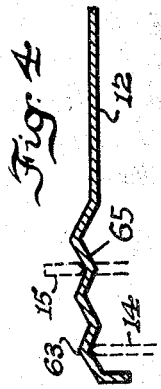
Inventors
Mike A. Provi
Harry L. Mattson
Atty

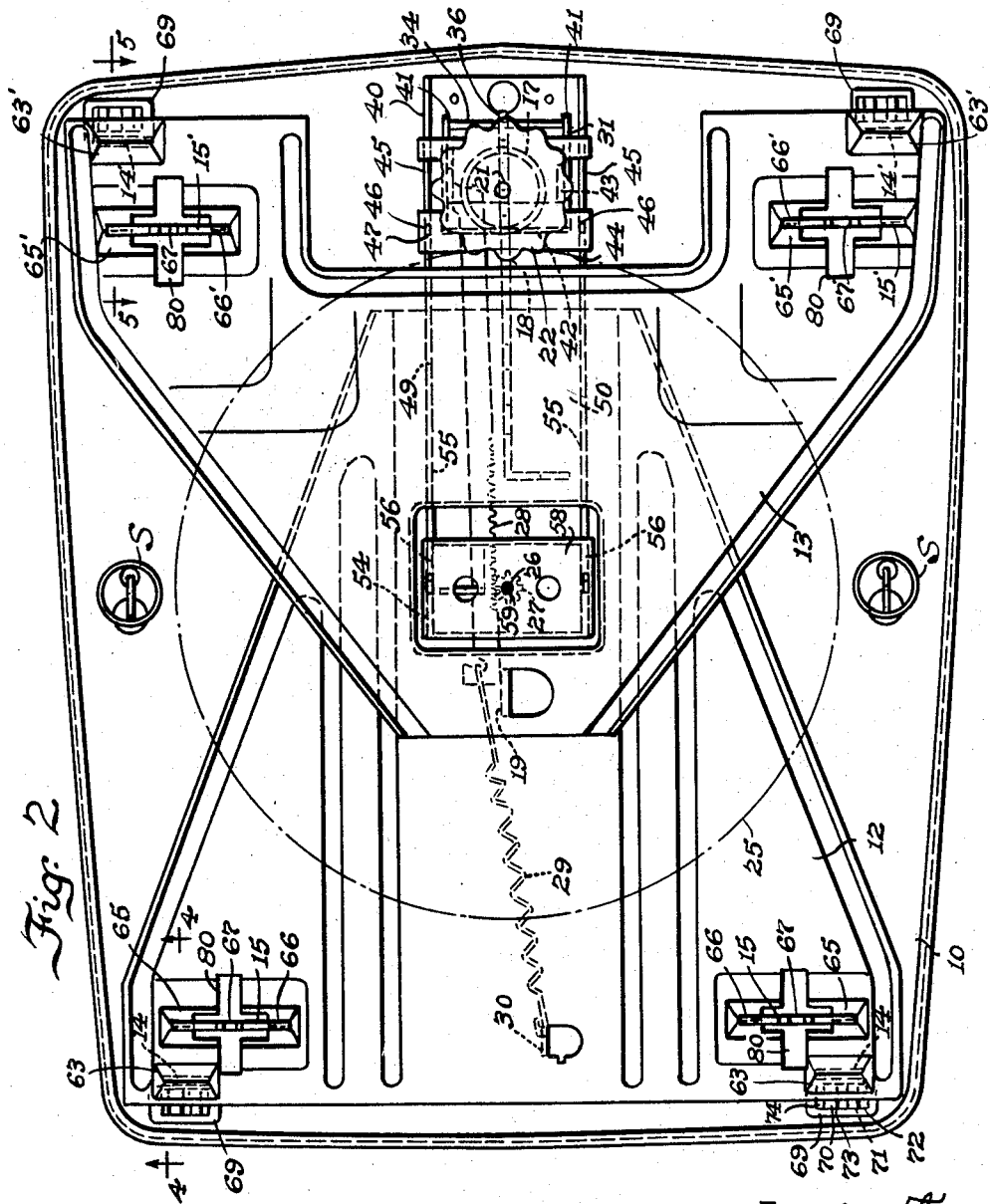

March 3, 1959 M. A. PROVI ET AL 2,875,999
BATHROOM SCALE
Filed Aug. 31, 1954 3 Sheets-Sheet 3
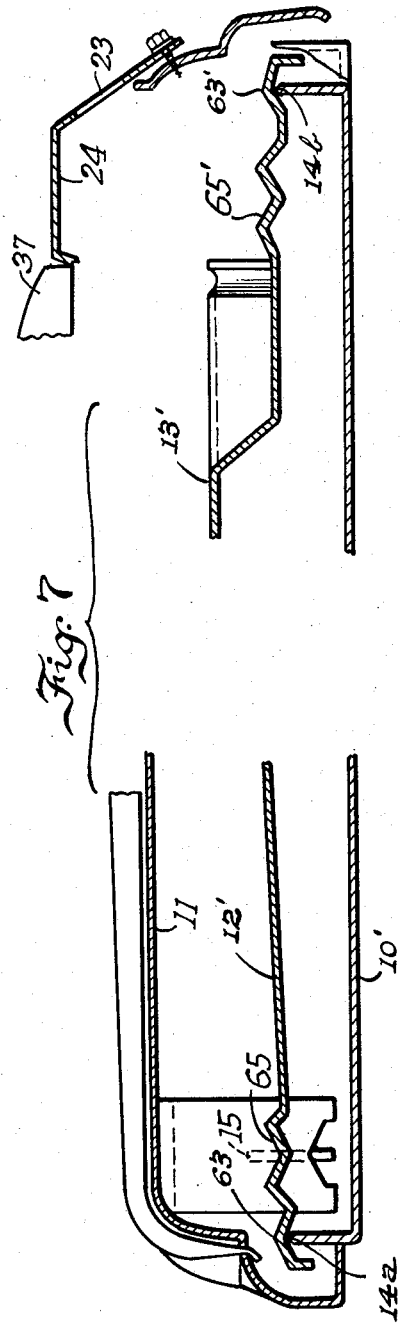
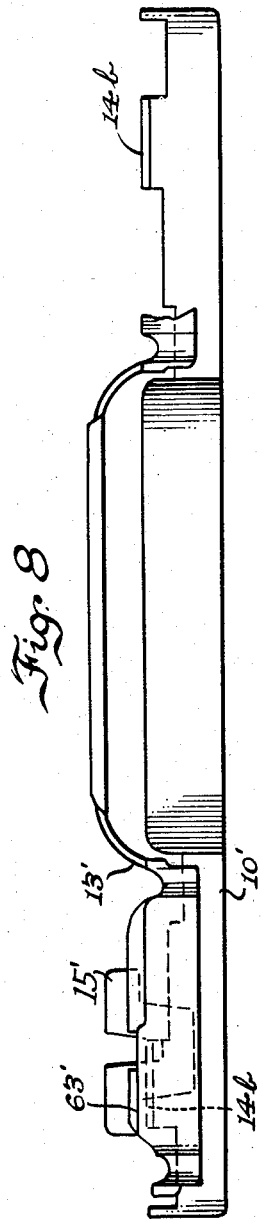
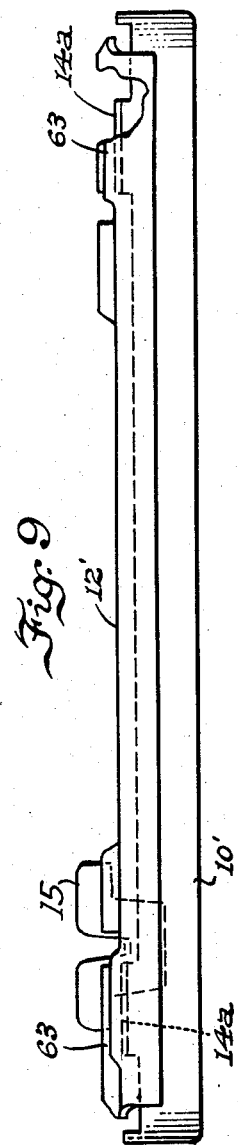
Inventors
Mike A. Provi
Harry L. Mattson

United States Patent Office 2,875,999
Patented Mar. 3, 1959

2,875,999

BATHROOM SCALE

Mike A. Provi and Harry L. Mattson, Rockford, Ill., assignors to The Brearley Company, Rockford, Ill., a corporation of Illinois Application August 31, 1954, Serial No. 453,267

23 Claims. (Cl. 265—68)

This invention relates to bathroom scales, and has for its principal object the provision of a scale mechanism of more compact design and one which is, at the same time, more accurate in its operation, greater compactness being obtained in a vertical direction with a view to securing a much lower elevation of the scale platform than has heretofore been possible.

More specifically stated, the scale of our invention includes the following improvements:

(1) The rocker arm, whose oscillation upon depression of the platform causes the operation of the rack and pinion operating the weight-indicating dial, was previously mounted under the dial, thereby requiring higher elevation of the dial and accordingly of the weighing-platform than would otherwise be necessary while at the same time imposing a limitation upon the radius of operation of the lever. In accordance with our invention, the rocker arm is mounted in front of the dial with the weighing-spring. The dial, therefore, can be placed lower and, likewise, the weighing-platform so as to obtain a much lower scale than was considered possible heretofore. This arrangement is advantageous also because, despite the lowering of the dial and platform which it was aimed at accomplishing, it enables increasing the length of the arm attached to the dial-operating rack and, accordingly, reducing the error in weight-indication commonly known as the "arc error," there being less and less error introduced the more nearly the travel of the outer end of the arm approaches a straight line. In order not to necessitate an increase in overall length of the scale by reason of the new location of the rocker arm, we have designed the latter so that the weighing spring is arranged to "nest" in it, the rocker arm being made U-shaped to reach around said spring, so that it is pivoted in the vertical plane of the spring at opposite sides thereof and the downwardly reaching arm attached to the rack is disposed alongside and reaches a bit forwardly of said spring.

(2) A single elongated, sheet metal, channel-shaped member is provided in accordance with our invention mounted by its web portion on the front middle portion of the base, and provides on its rear end a rigid support for the dial and its operating pinion, and on its front end, in a rigid tied-up relationship to the dial support, a support for the weighing-spring and rocker arm, whereby weighing spring deflection is more accurately reflected in indicated pounds by dial rotation by reason of the elimination of the inaccuracies previously introduced as a result of distortion of the base between the spring support and dial support.

(3) Much longer fulcrum bearings are provided for the weighing levers on the base in accordance with our invention in order to reduce wear on the fulcrums by reason of the decreased unit bearing pressure and at the same time improve the accuracy of operation of the scale in general, this increase in length of fulcrum bearings being obtained by providing upwardly embossed elongated pockets of the desired increased length on the corner portions of the weighing levers into which knife-edged upward projections of proportionately increased length, provided either on the end walls of the base itself or on brackets secured to the base, are arranged to engage. In like manner, downwardly struck elongated pockets are formed on the weighing levers in parallel spaced relation to the aforesaid upwardly embossed portions to provide longer fulcrum bearings for the knife-edged portions of hangers on which the scale platform is supported, whereby again to reduce wear by reason of the reduced unit bearing pressure and make for increased accuracy of operation.

(4) The supporting feet at the four corners of the base are assembled directly onto the supporting and attaching portions of the brackets that are mounted on the base for support of the weighing levers, whereby to locate the feet substantially directly under the fulcrums for the weighing levers and accordingly greatly reduce torque distortion of the base and insure closer accuracy in weighing.

The invention is illustrated in the accompanying drawings, in which

Fig. 1 is a longitudinal section on a reduced scale of a bathroom scale made in accordance with our invention;

Fig. 2 is a plan view of the scale mechanism with the platform and weight-indicating dial removed, the location of the latter being indicated only in dot and dash lines;

Fig. 3 is a vertical section on a larger scale through the combined rocker arm and spring mounting, showing how the rocker arm extends around the weighing-spring and straddles the front end of the weighing-lever and bears on the front end portion of the lever, so as to transmit movement to the rack upon deflection of the lever and spring under load;

Figs. 4 and 5 are sectional details of the weighing-levers on the lines 4—4 and 5—5 of Fig. 2;

Fig. 6 shows two views at right angles to one another of one of the molded plastic feet for support of the base provided in connection with the attaching pad portions of the knife-edged fulcrums for the weighing-levers;

Fig. 7 is a fragmentary, longitudinal, sectional view of another bathroom scale constructed along the lines of Fig. 1 but having the fulcrum bearings for the weighing-levers provided on the end walls of the base, and Figs. 8 and 9 are end views of the base taken from the front and rear of Fig. 7.

Similar reference numerals are applied to corresponding parts throughout the views.

Referring first to Figs. 1 to 6, the reference numeral 10 designates the generally rectangular sheet metal base or bottom pan of a bathroom scale, and 11 the generally rectangular sheet metal platform supported on said base by means of two levers 12 and 13, which are also preferably made of sheet metal. The lever 12 is supported on the base 10 on a pair of fulcrums 14 and carries a pair of hangers 15 on which rest a pair of downwardly projecting legs 16 for support of the rear end portion of the platform 11. In a similar manner, lever 13 is supported on the base 10 on another pair of fulcrums 14', and carries a pair of hangers 15' on which rest another pair of downwardly projecting legs, like legs 16, for support of the front end portion of the platform 11. A coiled tension spring 17 serves as the weighing spring and is suspended, as hereinafter described, above the front end portion of the base 10 for suspension thereon of the front end portion 18 of the lever 12 to resist downward deflection thereof under the weight imposed thereon when a person stands on the platform 11, as when weighing himself. Weight imposed on the platform 11 is transmitted directly to the lever 12 through legs 16 provided under the rear end portion of the platform, but the weight imposed by the front end portion of the platform 11 on lever 13 is transmitted through said lever to the middle portion of lever 12 at the rear end of the lever 13 where there is a downwardly projecting lug 19 having an arcuate bottom edge 20 resting on lever 12. A screw 21 rigid with the upper end of spring 17 is suspended on a handnut 22 accessible for manual adjustment through an opening 23 in a cover plate 24 mounted on top of the platform 11 at the front end thereof, the nut being adjusted one way or the other to adjust the spring up or down in order to set the scale back to zero when and if it gets out of adjustment. It is the downward deflection of the front end portion 18 of the lever 12 against the resistance of spring 17 that is used to cause rotation of the weight indicating dial 25. The dial is carried on a vertical shaft 26 supported for rotation, as hereinafter described, over the central portion of the base 10, and a pinion 27 is provided on the lower end thereof for transmitting rotation thereto. A rack 28 meshes with the pinion and is biased toward the pinion by a light coiled tension spring 29 that is attached at one end to the rear end of the rack and at its other end to a lug 30 struck downwardly from the rear end portion of lever 12. The spring 29, in addition to holding the rack 28 resiliently in engagement with pinion 27, exerts enough pull on the rack 28 to operate the dial 25 whenever the rack 28 is free to move, as when the lever 12 is given downward deflection in a weighing operation, a bell-crank lever 31 pivotally connected at 32 to the front end of the rack 28 being then allowed to oscillate from its zero position through an angle the size of which is proportionate to the amount of downward deflection of the lever 12 so as to cause rotation of the dial 25 through a proportionate angularity and thereby indicate the weight of the person standing on the platform. It will suffice at this point to state that the bell-crank lever 31 is pivoted with respect to the base 10 on a horizontal axis, as indicated at 33, and that it carries a horizontally extending pin 34 bearing very lightly and with sliding line contact against the flat top surface 35 on an upwardly projecting finger 36 provided on the front end portion 18 of lever 12. Hence, when lever 12 is deflected downwardly the finger 36 moves downwardly away from pin 34, and bell-crank lever 31, being then free to swing, swings in a clockwise direction under the action of spring 29. There is, therefore, only the light spring pressure of spring 29 effective in the operation of the dial so that the dial operation is shockless and no damage can be done to this more or less delicate part of the mechanism if a person jumps on the scale or is otherwise too rough in the handling and operation thereof. The weight reading indicated on the dial 25 can be viewed by the person standing on the platform 11 by looking down through a magnifying lens 37 which is suitably clamped in place on the front end portion of the platform 11 over a window opening 38, wherein a double hairline member 39 is provided in a vertical plane in accordance with the disclosure in the copending application of Mike A. Provi, Serial No. 330,824, filed January 12, 1953 (which resulted in Patent No. 2,788,963, issued April 16, 1957), said member 39 serving as a guide to insure sighting along a truly vertical line in order to get an accurate weight reading. In passing, attention is called to two coiled tension springs indicated at S in Fig. 2. These are suitably attached at their upper ends to the underside of the platform 11 and are stretched to place the same under a predetermined tension and are hooked onto the base 10 in order to tie the base and platform together resiliently and thereby keep the scale parts in assembled relation, so that one may pick up and carry the scale from one place to another without danger of having the scale come apart. These springs also insure maintenance of the levers 12 and 13 in the correct relationship to their fulcrums 14 and 14' at all times and maintenance of the hangers 15 and 15' in proper relationship at all times to levers 12 and 13, respectively, as well as maintenance of the downwardly projecting legs 16 on the platform in proper engagement with the hangers 15 and 15'.

*Improvement No. 1.*—This has reference to combining the rocker arm mounting and the spring mounting in one and the same supporting bracket 40. The bell-crank lever 31 is U-shaped in horizontal section, as clearly appears in the plan view thereof in Fig. 2, providing the two parallel side portions 41 on diametrically opposite sides of the spring 17 and the interconnecting integral cross-portion 42 behind the spring, so that the spring is rather neatly enclosed on three sides by said lever, giving the desired compactness and avoiding the necessity for any increase in overall length of the scale, despite the fact that the bell-crank lever 31, which was heretofore invariably located under the dial and within the circle thereof, is herein located in front of the dial 25 with the weighing spring 17. This location of the bell-crank lever 31 makes it possible to increase the radius 32—33 without affecting the height of the scale, inasmuch as the weighing spring support 40, being at the front end of the scale and enclosed by the cover plate 24 provided on the front portion of the platform 11 does not have any such height limitation as the parts that have to be disposed under the platform. Consequently, the "arc error" in weight indication is reduced, because the travel of the pivot 32 is so much closer to a straight line than it would be if the radius 32—33 was reduced enough to permit disposition of the lever 31 under the dial 25. Furthermore, with the lever 31 located in front of the dial, the dial may be placed at a much lower elevation than would otherwise be possible and that in turn allows placing the platform 11 at a correspondingly lower elevation, as clearly appears in Fig. 1.

The construction, despite this new and more compact arrangement of elements, is not at all complicated or expensive. Coaxially arranged shouldered rivets 33 fasten the opposite side portions 41 of the lever 31 to the outer sides of a pair of downwardly projecting lugs 43 provided in spaced parallel relationship on a horizontal plate 44 mounted on top of the parallel side walls 45 of the bracket 40 and suitably secured in place thereon as by swedging or upsetting the projecting upper end portion of lugs 46 which extend through slots 47 provided therefor in the plate 44. The pin 34 previously referred to is mounted in coaxially aligned holes 48 provided therefor in the opposite side walls 41 of the lever 31 and, as clearly appears in Fig. 2, bears at the middle portion thereof on top of the upwardly extending finger 36 provided on the lever 12.

*Improvement No. 2.*—This has reference to combining in one rigid member a dial support and a weighing spring support. A single elongated sheet metal channel-shaped member 49 is provided for this purpose and is mounted by means of its web portion 50 on the front middle portion of the base 10 and suitably secured in place by upwardly projecting extruded tubular rivet portions 51 provided on the base 10 and extending through holes 52 provided therefor in the web portion 50, the protruding upper end portions 53 of these tubular rivet portions 51 being swedged over the top of the web 50 to fasten the member 49 in place. Member 49 provides the bracket 40, above described as the spring support, on its front end portion. Member 49 provides on its rear end portion a supporting bracket 54 of generally similar construction to bracket 40, only of much lower height, for support of the dial 25 and its shaft 26 and operating pinion 27, whereby to insure, as a result of the inherent rigidity of member 49, elimination of the inaccuracy previously introduced as a result of distortion of the base 10 between the weighing spring support 40 and the dial support 54, it being manifest that the more accurately the deflection of the weighing spring 17 per pound applied to the platform 11 is converted into dial rotation, the more accurately the scale will weigh. In other words, spring deflection and dial operation occur in one and the same unit 49, by providing the supporting brackets 40 and 54 at opposite ends of the same channel-shaped member 49 so that torque distortion of the base 10 is no longer a source of error in the weight indication and accordingly far greater accuracy in weighing is obtained than was ever possible heretofore where the brackets 40 and 54, or their equivalent, were separate parts interconnected only by the relatively distortable base. The flanges 55 forming the side walls of the channel member 49 serve to connect in rigid relationship the side walls 45 of bracket 40 with the side walls 56 of bracket 54 and also to rigidify and reinforce the member 49 generally so as to reduce torque distortion thereof to a minimum. The web 50 is cut away at 52' under the arm 41 to provide additional operating clearance and permit making the arm as long as shown. The dotted arc in Fig. 3 indicates how the arm works in the slot 52' but clears the top of base 10. The web 50 is embossed, as indicated at 57, to provide a radial bearing for the lower end of the shaft 26 while the base 10 provides an end thrust bearing therefor, and a plate 58 is secured to the top of the side walls 56 in a manner similar to the fastening of plate 44 on side walls 45 and provides a radial bearing opening 59 for reception of an intermediate portion of the shaft 26. Disk 60 is mounted on the upper end of the shaft 26 and supports the dial 25 while another disk 61 serves to clamp the dial onto the disk 60 when a nut 62 threaded on the upper end of the shaft 26 is tightened.

*Improvement No. 3.*—This has reference to the longer fulcrum bearings 14 and 14' for the weighing levers 12 and 13, respectively, on base 10 to reduce wear on the fulcrums by reason of the decreased unit bearing pressure and at the same time improve the accuracy of operation of the scale in general, the increase in length of fulcrum bearings being obtained by providing upwardly embossed elongated pockets 63 and 63' of the desired increased length on the corner portions of the levers 12 and 13, respectively, into the V-shaped recesses of which pockets knife-edged upward projections 14 and 14' of proportionately increased length provided on brackets 64 secured to the base 10 are arranged to engage, as clearly appears in Figs. 1, 2, 4 and 5. In like manner and for similar reasons, downwardly struck elongated pockets 65 and 65' are provided on the weighing levers 12 and 13, respectively, in inwardly spaced parallel relation to the aforesaid upwardly embossed portions 63 and 63' to provide elongated fulcrum bearings for the knife-edged bottoms of arms 66 and 66' of hangers 15 and 15' which support on the upwardly facing knife edges 67 and 67' of the depressed middle portions of the hangers 15 and 15' the V-notched lower ends of downwardly projecting legs 16 on the opposite ends of the scale platform 11 for support of the latter, the pockets 65 and 65' having cross-shaped openings 80 provided therein for reception of said hangers 15 and legs 16, as shown. This elongation of the fulcrum bearings and corresponding elongation of the knife edges engaging therein reduces the cutting or galling action when there is a heavy weight imposed on the platform, and the unit bearing pressure being so greatly reduced, the knife edges are not exposed to noticeable wear after extended periods of normal service. Aside from these improvements, the levers 12 and 13 resemble those disclosed and claimed in Provenzano Patent No. 2,668,045.

In Figs. 7 to 9 the same elongation of fulcrum bearings for the weighing levers on the base is shown, for a similar purpose, but in this construction the knife edged upward projections of increased length are provided as integral portions of the end walls or flanges of the base 10', as indicated at 14a and 14b, the scale being otherwise of the same construction as in Figs. 1 and 2. That is to say, the main weighing lever 12' in this scale has its upwardly embossed elongated pockets 63 resting directly on the knife edged upward projections 14a provided on the base 10', and these projections 14a are elongated, as indicated in Fig. 9, as are also the pockets 63, the latter providing V-shaped recesses therein for accurate engagement of the knife edges of projections 14a therein similarly as the fulcrums 14 have their knife edges engaged in the pockets 63 on lever 12. In like manner, knife edged upward projections 14b on the front end flange are engaged in the V-shaped recesses provided in the upwardly embossed elongated pockets 63' provided on the secondary weighing lever 13' so that that lever is also fulcrumed directly on the base at the front end thereof.

*Improvement No. 4.*—In order to reduce torque distortion of the sheet metal base 10 to a minimum when weight is applied on the platform 11, as when a person is being weighed, the brackets 64 providing fulcrum bearings 14 and 14' are not only located substantially directly over the supporting feet 68, but the supporting and attaching pad portions 69 of the brackets 64 are specially constructed to serve as retaining receptacles or keepers for the upwardly projecting spring tines 70 provided on said feet to fasten the feet securely to the bottom of the base 10 at the four corners thereof. Thus, there is a rectangular hole 71 provided in the base at each corner, and struck up from opposite ends of this hole are lugs 72 which extend through the opposite ends of another rectangular hole 73 provided in the supporting and attaching portion 69 of the bracket 64 at that corner of the base, the protruding upper ends of these lugs 72 being swedged over the top of the supporting and attaching portion 69, as indicated at 74 in Fig. 6, to secure the bracket in place. The tines 70 are pressed home and rely partly upon the inherent springiness thereof and partly upon the tapers on the outer sides of their upper end portions indicated at 76 in Fig. 6 to assist insertion thereof, the springiness of the tines being relied upon after the insertion to provide enough friction grip at the opposite ends of the hole 73 where the tines engage the inner sides of the lugs 72 to reduce likelihood of the feet working loose and eventually dropping out and becoming lost. This snap-in construction on the supporting feet facilitates assembling of the scale and reduces the cost of manufacture while the method of assembly directly onto the brackets that provide the fulcrums for the weighing levers means the elimination of torque distortion of the base and accordingly insures closer accuracy in weighing. The feet 68 are preferably of molded plastic construction with a view to closer uniformity in quantity production and further savings in the cost of manufacture.

It is believed the foregoing description conveys a good understanding of the objects and advantages of our invention. The appended claims have been drawn to cover all legitimate modifications and adaptations.

We claim:

1. A weighing scale comprising a horizontal base having a front end portion, weighing levers fulcrumed on said base, a horizontal platform movably supported above said base on said weighing levers, a weight indicating dial rotatably supported on said base in a horizontal plane above the base between the weighing levers and the platform, a support disposed in front of said dial and carried on the front end portion of said base, a coiled tension spring suspended on said support and connected so as to suspend said weighing levers and resist downward deflection thereof under weight on the platform, a rack and pinion mechanism connected with said dial to turn it, and a bell-crank lever disposed in front of said dial with said spring and pivotally mounted on said spring support and operatively connecting said weighing levers with said rack and pinion mechanism, the said location of said bell-crank lever permitting use of a lever having a relatively long arm with a correspondingly long operating radius and accordingly reduced arc error in the operation of said dial to indicate weight.

2. A weighing scale comprising a horizontal base having a front end portion, weighing levers fulcrumed on said base, a horizontal platform movably supported above said base on said weighing levers, a weight indicating dial rotatably supported on said base in a horizontal plane above the base between the weighing levers and the platform, a support disposed in front of said dial and carried on the front end portion of said base, a coiled tension spring suspended on said support and connected so as to suspend said weighing levers and resist downward deflection thereof under weight on the platform, a rack and pinion mechanism connected with said dial to turn it, and a U-shaped bell-crank lever disposed in front of said dial with said spring enclosed between the arms of the U, said arms being pivotally mounted at opposite sides of said spring support on a horizontal axis at an elevation approximately as high as said dial, said bell-crank lever having an elongated arm extending downwardly providing a long radius operating connection at its lower end with said rack and pinion mechanism, said bell-crank lever being arranged to be oscillated upon downward deflection of said weighing levers.

3. A weighing scale comprising a horizontal base having a front end portion, weighing levers fulcrumed on said base, a horizontal platform movably supported above said base on said weighing levers, a weight indicating dial rotatably supported on said base in a horizontal plane above the base between the weighing levers and the platform, counterpoise spring means resisting downward deflection of said levers under weight on the platform, a rack and pinion mechanism connected with said dial to turn it, a support disposed in front of said dial and carried by said base on the front end portion thereof, and a bell-crank lever pivotally mounted on said support on a horizontal axis at an elevation at least as high as said dial, said bell-crank lever having an elongated arm extending downwardly to close proximity with the base providing a long radius operating connection at its lower end with said rack and pinion mechanism, said bell-crank lever being arranged to be oscillated upon downward deflection of said weighing levers.

4. A bathroom scale comprising a horizontal base having a front end portion, weighing levers fulcrumed on said base, a horizontal platform movably supported above said base on said weighing levers, said platform having an opening provided in the front end portion thereof, a weight indicating dial rotatably supported on said base in a horizontal plane above the base between the weighing levers and the platform forward enough so that a front portion thereof may be viewed through the opening in the platform, a supporting bracket carried on the front end portion of said base and extending upwardly therefrom in front of the dial through the opening in said platform, a manually adjustable nut resting on top of said bracket for adjustment exteriorly of said scale, a screw threaded in said nut, a weighing spring fixed to and suspended from said screw and connected with said weighing levers to resist downward deflection thereof under weight applied to the platform, a pinion for turning said dial, a rack meshing with the pinion disposed below said weighing levers, and a bell-crank lever pivotally mounted on said bracket in front of said dial on a horizontal axis at an elevation approximately as high as said dial, said bell-crank lever having an elongated arm extending downwardly providing a large radius operating connection at its lower end with said rack, said lever being arranged to be oscillated upon deflection of said weighing levers.

5. In a weighing scale comprising a base, weighing levers fulcrumed thereon, and a platform movably supported over said base on said weighing levers, the combination of a coiled tension spring for resisting downward deflection of said levers under weight applied thereto by the platform when loaded, a U-shaped bell-crank lever oscillatable upon deflection of said levers and connected with and arranged to operate a weight indicating means, and a single supporting bracket for suspension of the upper end of said spring and pivotal support of the upper end of said lever carried on said base, said spring being disposed between the arms of the U-shaped lever for compactness of assembly.

6. In a bathroom scale comprising a base, weighing levers fulcrumed thereon, and a platform movably supported over said base on said weighing levers, a supporting bracket mounted on the base and extending upwardly therefrom through an opening in the front portion of the platform and having a manually adjustable nut supported on the top thereof, a screw threaded in said nut, a coiled tension spring fixed to and suspended from said screw for up and down adjustment in said bracket and connected at its lower end with said weighing levers to resist downward deflection thereof under weight applied by the platform when loaded, a U-shaped bell-crank lever pivotally mounted on said bracket and arranged to be oscillated upon depression of said levers, and a weight indicating means connected with said bell-crank lever for operation thereby, said lever having said spring disposed between the arms thereof for compactness of assembly.

7. A weighing scale comprising a horizontal base, weighing levers fulcrumed thereon, a horizontal platform movably supported above said base on said weighing levers, a weight indicating dial disposed in a horizontal plane above the base between the weighing levers and the platform, a rack and pinion mechanism connected with said dial to turn it, a coiled tension spring serving as the weighing spring disposed vertically in front of said dial and connected with said weighing levers to resist downward deflection thereof under weight applied to the platform, a unitary rigid support of elongated form mounted on but otherwise independent of said base under said weighing levers and providing on one end thereof a supporting bracket of relatively low elevation for rotatable support of said dial and providing on the other end thereof a supporting bracket of relatively high elevation extending upwardly in front of said dial for suspension on the upper end thereof of said spring, and a bell-crank lever pivotally mounted on said unitary support and operatively connecting said weighing levers with said rack and pinion mechanism.

8. A weighing scale as set forth in claim 7, wherein the rack of the rack and pinion mechanism is disposed at a low elevation above said base and wherein said bell-crank lever is disposed in front of said dial with said spring and is pivoted at a high elevation on the high bracket for long radius operation of said rack, said lever having an arm of elongated form extending downwardly and pivotally connected at its lower end with said rack.

9. A weighing scale as set forth in claim 7, wherein the base is of sheet metal construction and the weighing levers are fulcrumed on brackets having horizontal supporting and attaching base portions resting on the top of and secured to said base, the scale including supporting feet under the base and abutting the bottom thereof and having upward projections for fastening the feet in place received in registering openings provided therefor in the base and in the aforesaid supporting and attaching portions of said brackets, whereby said supporting feet are located substantially directly below the fulcrums for said levers to reduce torque distortion of said base.

10. A bathroom scale comprising a rectangular sheet metal base pan having supporting feet under the four corner portions thereof, weighing levers fulcrumed on the four corner portions of said base pan, a platform movably supported on said weighing levers, counterpoise spring means located over one end portion of said base pan connected with said weighing levers to resist downward deflection thereof under weight applied to the platform, weight indicating means located over the central portion of said base pan, means connected for operating the weight indicating means and movable in response to movement of said weighing levers, and a unitary elongated rigid support channel mounted on said base pan longitudinally thereof on its center line and carrying the counterpoise spring means on one end portion thereof and the weight indicating means on the other end portion thereof and also supporting on the first mentioned end portion the means movable with the weighing levers which operates the weight indicating means, said unitary support being substantially independent of torque distortion of said base pan under load applied to the platform, whereby the weight indicating means more accurately indicates the weight supported on the platform regardless of distortion of the base pan.

11. A bathroom scale as set forth in claim 10, wherein the weighing levers are fulcrumed on brackets having horizontal supporting and attaching base portions resting on the top of and secured to said base pan, the supporting feet under the base pan abutting the bottom thereof and having upward projections for fastening the feet in place received in registering openings provided therefor in the base pan and in the aforesaid supporting and attaching portions of said brackets, whereby said supporting feet are located substantially directly below the fulcrums for said levers to reduce torque distortion of said base pan.

12. In a weighing scale comprising a generally rectangular sheet metal base pan, weighing levers fulcrumed on the four corner portions of said base pan, and a platform supported on said levers, an elongated channel member of rigid construction supported on but otherwise independent of said base pan extending longitudinally thereof on its center line from the central portion thereof to the front end portion, a weight indicator disposed substantially centrally with respect to said base pan and mounted in a bracket formed in part by one channel-shaped end portion of said channel member, a weighing spring disposed over the front end portion of said base pan and suspended in a second bracket formed in part by the channel shaped other end portion of said channel member, said spring being connected with said levers to resist deflection thereof under weight applied to said platform, and a bell-crank lever also pivotally mounted in the channel of said channel member and operatively connecting said weighing levers with said weight indicator.

13. In a weighing scale comprising a base, weighing levers fulcrumed thereon, and a platform supported on said levers, an elongated channel member of rigid construction supported on but otherwise independent of said base, the end portions of said channel member having the side walls thereof extended upwardly, top walls secured onto the upper ends of said side walls to complete brackets at opposite ends of said channel member while cross-bracing the end portions thereof, a weight indicator dial having a vertical shaft fixed thereto and received in bearings in the bracket at one end of said channel member, a weighing spring suspended in the bracket at the other end of said channel member and connected with said levers to resist deflection thereof under weight applied to said platform, a bell-crank lever also pivotally mounted in the same bracket as suspends said spring, a rack operated by said lever, and a pinion fixed on the dial shaft and meshing with said rack.

14. In a weighing scale comprising a base, weighing levers fulcrumed thereon, and a platform supported on said levers, an elongated channel member of rigid construction supported on but otherwise independent of said base, the end portions of said channel member having the side walls thereof extended upwardly, top walls secured onto the upper ends of said side walls to complete brackets at opposite ends of said channel member while cross-bracing the end portions thereof, a weight indicator dial having a vertical shaft fixed thereto and received in bearings in the bracket at one end of said channel member, a weighing spring suspended in the bracket at the other end of said channel member and connected with said levers to resist deflection thereof under weight applied to said platform, a bell-crank lever also pivotally mounted in the same bracket as suspends said spring, a rack operated by said lever, and a pinion fixed on the dial shaft and meshing with said rack, the dial shaft bracket being of relatively small height and said dial shaft being received in coaxially aligned bearing holes provided in the top wall applied to the channel member and the web portion of the channel member, said shaft having the dial on its upper end portion and the pinion on its lower end portion, the spring suspension bracket being of appreciably greater height, whereby to provide pivotal bearings for said bell-crank lever at appreciable elevation from the bottom of the channel member, said bell-crank lever having an elongated arm extending downwardly providing a long radius operating connection at its lower end near the bottom of the channel member with the rack.

15. A weighing scale as set forth in claim 14, wherein the web portion of said channel member is cut away below the lower end of said arm of said bell-crank lever to provide added operating clearance and thus permit using an even longer radius arm than would otherwise be possible.

16. A weighing scale comprising a generally rectangular horizontal base having upward projections on corner portions thereof providing horizontal elongated knife edges crosswise with respect to one end of the base, an elongated substantially horizontal platform supporting lever of sheet metal construction, said lever having upwardly struck elongated pocket portions crosswise of one end thereof and of inverted V-cross-section registering with the aforesaid upward projections on the base and receiving the knife edges thereof in the V thereof for low friction fulcrum support of said lever on said base, said lever also having downwardly struck similarly elongated pocket portions of V cross-section provided thereon in inwardly spaced parallel relation to the first named pocket portions, the last named pocket portions having openings provided therein to accommodate hangers, hangers suspended in said openings by fulcrum engagement in the V of the last named pocket portions, a horizontal weight receiving platform of generally rectangular form having downward projections resting in said hangers, and counterbalancing means on which said lever is yieldingly suspended with respect to said base.

17. A weighing scale as set forth in claim 16, wherein the base is of sheet metal construction having an upwardly projecting reinforcing marginal flange and wherein said upward projections are provided on said flange.

18. A weighing scale as set forth in claim 16, wherein the base is of sheet metal construction and the upward projections are provided on brackets having horizontal supporting and attaching base portions resting on the top of and secured to said base, the scale including supporting feet under the base and abutting the bottom thereof and having upward projections for fastening the feet in place received in registering openings provided therefor in the base and in the aforesaid supporting and attaching portions of said brackets, whereby said supporting feet are located substantially directly below the fulcrums for said levers to reduce torque distortion of said base.

19. In a weighing scale comprising a horizontal base, weighing levers fulcrumed thereon, a horizontal platform movably supported above said base on said weighing levers, a weight indicating dial disposed in a horizontal plane above the base between the weighing levers and the platform, means connected with said dial to turn it in accordance with depression of said weighing levers under load applied to said platform, and a coiled tension spring serving as the weighing spring disposed vertically in front of said dial and connected with said weighing levers to resist downward deflection thereof under weight applied to the platform, a unitary rigid support of elongated form mounted on but otherwise independent of said base under said weighing levers and providing on one end thereof a supporting bracket for rotatable support of said dial and providing on the other end thereof a supporting bracket extending upwardly in front of said dial for suspension on the upper end thereof of said spring, and a bell-crank lever pivotally mounted on said unitary support and operatively connecting said weighing levers with said dial operating means.

20. A weighing scale as set forth in claim 19, wherein the means connected with said dial to turn it is disposed at a low elevation above said base and wherein said bell-crank is disposed in front of said dial with said spring and is pivoted at a high elevation on the bracket provided therefor for long radius operation of said dial operating means, said lever having an arm of elongated form extending downwardly and pivotally connected at its lower end with said dial operating means.

21. A weighing scale as set forth in claim 19 wherein the means connected with said dial to turn it is disposed at a low elevation above said base and wherein said bell-crank is disposed in front of said dial with said spring and is pivoted at a high elevation on the bracket provided therefor for long radius operation of said dial operating means, said lever having an arm of elongated form extending downwardly and pivotally connected at its lower end with said dial operating means, the unitary rigid support being cut away below the lower end of said arm of said bell-crank lever to provide added operating clearance and thus permitting using an even longer radius arm than would otherwise be possible.

22. A weighing scale as set forth in claim 19 wherein the base is of sheet metal construction and there are brackets mounted thereon on which the weighing levers are fulcrumed on said base, said brackets having horizontal supporting and attaching base portions resting on the top of and secured to said base, the scale including supporting feet under the base and abutting the bottom thereof and having upward projections for fastening the feet in place received in registering openings provided therefor in the base and in the aforesaid supporting and attaching portions of said brackets, whereby said supporting feet are located substantially directly below the fulcrums for said levers to reduce torque distortion of said base.

23. In a weighing scale comprising a sheet metal base pan, weighing levers fulcrumed thereon, a platform movably supported on said weighing levers, counterpoise spring means connected with said weighing levers, and weight indicating means operable in accordance with downward deflection of said weighing levers when weight is applied to the platform, brackets mounted on said base pan for fulcrum support of said weighing levers, said brackets having horizontal supporting and attaching base portions resting on the top of and secured to said base pan, and supporting feet under the base pan and abutting the bottom thereof and having upward projections for fastening the feet in place received in registering openings provided therefor in the base pan and in the aforesaid supporting and attaching portions of said brackets, whereby said supporting feet are located substantially directly below the fulcrums for said levers to reduce torque distortion of said base.

References Cited in the file of this patent

UNITED STATES PATENTS

| | | |
|---|---|---|
| 1,465,613 | Munk | Aug. 21, 1923 |
| 2,061,271 | Eschenbacher et al. | Nov. 17, 1936 |
| 2,066,243 | Barler et al. | Dec. 29, 1936 |
| 2,097,919 | Garbell | Nov. 2, 1937 |
| 2,098,845 | Weber et al. | Nov. 9, 1937 |
| 2,228,874 | Greenleaf | Jan. 14, 1941 |
| 2,668,045 | Provenzano | Feb. 2, 1954 |
| 2,766,038 | Weber | Oct. 9, 1956 |